(12) United States Patent
Jin

(10) Patent No.: US 10,782,989 B2
(45) Date of Patent: Sep. 22, 2020

(54) METHOD AND DEVICE FOR VIRTUAL MACHINE TO ACCESS STORAGE DEVICE IN CLOUD COMPUTING MANAGEMENT PLATFORM

(71) Applicant: SurCloud Corp., Union City, CA (US)

(72) Inventor: Youbing Jin, Beijing (CN)

(73) Assignee: SURCLOUD CORP., Union City, CA (US)

( * ) Notice: Subject to any disclaimer, the term of this patent is extended or adjusted under 35 U.S.C. 154(b) by 0 days.

(21) Appl. No.: 16/121,080

(22) Filed: Sep. 4, 2018

(65) Prior Publication Data
US 2018/0365041 A1    Dec. 20, 2018

Related U.S. Application Data

(63) Continuation-in-part of application No. PCT/CN2017/075301, filed on Mar. 1, 2017, and a
(Continued)

(30) Foreign Application Priority Data

Feb. 3, 2016  (CN) .......................... 2016 1 0076422
Mar. 3, 2016  (CN) .......................... 2016 1 0120933

(51) Int. Cl.
G06F 3/06      (2006.01)
G06F 9/455     (2018.01)
G06F 16/14     (2019.01)

(52) U.S. Cl.
CPC .......... *G06F 9/45533* (2013.01); *G06F 3/061* (2013.01); *G06F 3/0604* (2013.01);
(Continued)

(58) Field of Classification Search
CPC .... G06F 9/45533; G06F 3/067; G06F 3/0664; G06F 3/0673; G06F 16/148; G06F 3/061;
(Continued)

(56) References Cited

U.S. PATENT DOCUMENTS 7,865,663 B1 *  1/2011  Nelson .................... G06F 13/42
                                                      711/112
9,098,321 B2 *  8/2015  Uemura .............. G06F 9/45533
(Continued)

OTHER PUBLICATIONS

S. S. Pinter, Y. Aridor, S. Shultz and S. Guenender, "Improving machine virtualization with 'hotplug memory'," 17th International Symposium on Computer Architecture and High Performance Computing (SBAC-PAD'05), Rio de Janeiro, RJ, Brazil, 2005, pp. 168-175, doi: 10.1109/CAHPC.2005.29.*
S. Oikawa, "Virtualizing Storage as Memory for High Performance Storage Access," 2014 IEEE International Symposium on Parallel and Distributed Processing with Applications, Milan, 2014, pp. 18-25, doi: 10.1109/ISPA.2014.12.*

*Primary Examiner* — Pierre Miche Bataille
(74) *Attorney, Agent, or Firm* — Flener IP & Business Law; Zareefa B. Flener

(57) ABSTRACT

Embodiments of the present invention relate to a method and device for a virtual machine to access a storage device in a cloud computing management platform, which can solve the problem that, in the prior art, the virtual machine cannot be connected to the local storage device directly, but must be connected to the local storage device through the iSCSI protocol. The method includes: judging whether the storage device to be accessed by the virtual machine is on a same physical machine as the virtual machine; and when it is judged that the storage device is on the same physical machine as the virtual machine, mounting the storage device directly to the virtual machine.

9 Claims, 4 Drawing Sheets

--- it is judged whether a storage device to be accessed by a virtual machine is on the same physical machine as the virtual machine    — 301 when it is judged that the storage device is on the same physical machine as the virtual machine, the virtual machine is directly mounted to the storage device    — 302

Related U.S. Application Data continuation-in-part of application No. 16/054,536, filed on Aug. 3, 2018, which is a continuation-in-part of application No. PCT/CN2017/071830, filed on Jan. 20, 2017.

(52) U.S. Cl.
CPC ............ G06F 3/067 (2013.01); G06F 3/0631 (2013.01); G06F 3/0664 (2013.01); G06F 3/0673 (2013.01); G06F 16/148 (2019.01)

(58) Field of Classification Search
CPC ...... G06F 3/0631; G06F 3/0604; G06F 17/30; G06F 3/06; G06F 9/455
USPC .................................................. 711/114, 203
See application file for complete search history.

(56) References Cited

U.S. PATENT DOCUMENTS

| | | | | |
|---|---|---|---|---|
| 10,318,426 | B1* | 6/2019 | Kornfeld | G06F 3/067 |
| 2013/0262801 | A1* | 10/2013 | Sancheti | G06F 3/065 |
| | | | | 711/162 |
| 2014/0136803 | A1* | 5/2014 | Qin | G06F 3/065 |
| | | | | 711/162 |
| 2014/0250286 | A1* | 9/2014 | Kondo | G06F 9/5016 |
| | | | | 711/170 |
| 2014/0297782 | A1* | 10/2014 | Umbehocker | G06F 3/0604 |
| | | | | 709/216 |

* cited by examiner

METHOD AND DEVICE FOR VIRTUAL MACHINE TO ACCESS STORAGE DEVICE IN CLOUD COMPUTING MANAGEMENT PLATFORM

CROSS-REFERENCE TO RELATED APPLICATIONS

This application is a Continuation-In-Part application of PCT application No. PCT/CN2017/075301, filed on Mar. 1, 2017 which claims priority to CN Patent Application No. 201610120933.3, filed on Mar. 3, 2016. This application is also a Continuation-In-Part application of U.S. patent application Ser. No. 16/054,536, filed on Aug. 3, 2018, which is a Continuation-In-Part application of PCT application No. PCT/CN2017/071830, filed on Jan. 20, 2017 which claims priority to CN Patent Application No. 201610076422.6, filed on Feb. 3, 2016. All of the aforementioned applications are hereby incorporated by reference in their entireties.

TECHNICAL FIELD

Embodiments of the present invention relate to the technical field of cloud storage, and more specifically, to a method and a device for a virtual machine to access a storage device in a cloud computing management platform.

BACKGROUND

In a cloud computing system, a virtual machine needs to access a storage device in a storage network to read and write data. Taking a cloud computing system adopting an OpenStack framework as an example, computing nodes are connected to storage devices in the storage network through the iSCSI (internet Small Computer System Interface) protocol. FIG. 1 shows a conventional architecture for connecting a computing node to storage devices provided by the prior art. As shown in FIG. 1, each virtual machine on a physical machine A (computing node) needs an iSCSI client-side on the physical machine A to communicate with an iSCSI server-side on another physical machine B (storage node), and then is connected to the corresponding storage device (physical disks) by the iSCSI server-side.

FIG. 2 shows another architecture for connecting a computing node to storage devices provided by the prior art. As shown in FIG. 2, a storage node and a computing node are on the same physical machine A, so it is not optimized if the virtual machine still read and write data in the storage device through the iSCSI protocol. However, if virtual machines can be connected to the corresponding local storage devices directly instead of through the iSCSI protocol, the performance of data read and write will be greatly improved. Thus it can be seen that a method for virtual machines directly accessing local storage devices is in an urgent need.

On the other hand, with increasing scale of computer applications, a demand for storage space is also growing. Accordingly, integrating storage resources of multiple devices (e.g., storage mediums of disk groups) as one storage pool to provide storage services has become a current mainstream. A conventional distributed storage system is usually composed of a plurality of storage nodes connected by a TCP/IP network. FIG. 7 shows an architectural schematic diagram of a conventional storage system provided by prior art. As shown in FIG. 7, in a conventional storage system, each storage node S is connected to a TCP/IP network via an access network switch. Each storage node is a separate physical server, and each server has its own storage mediums. These storage nodes are connected to each other through a storage network, such as an IP network, to form a storage pool.

On the other side, each computing node is also connected to the TCP/IP network via the access network switch, to access the entire storage pool through the TCP/IP network. Access efficiency in this way is low.

However, what is more important is that, in the conventional storage system, once rebalancing is required, data of the storage nodes have to be physically moved.

SUMMARY

In view of this, embodiments of the present invention provide a method and a device for a virtual machine to access a storage device in a cloud computing management platform, which can solve the problem that, in the prior art, the virtual machine cannot be connected to the local storage device directly, but must be connected to the local storage device through the iSCSI protocol.

According to an embodiment of the present invention, a method for a virtual machine to access a storage device in a cloud computing management platform is provided. The method includes: judging whether a storage device to be accessed by a virtual machine is on a same physical machine as the virtual machine; and when it is judged that the storage device is on the same physical machine as the virtual machine, mounting the storage device directly to the virtual machine.

In an embodiment of the present invention, before the step of judging whether a storage device to be accessed by a virtual machine is on a same physical machine as the virtual machine, the method further includes: obtaining a global unique name of the storage device to be accessed by the virtual machine; wherein the judging whether the storage device to be accessed by the virtual machine is on a same physical machine as the virtual machine includes: searching in a file system of the physical machine where the virtual machine located to determine whether there is a name of a storage device containing the global unique name of the storage device to be accessed by the virtual machine.

In an embodiment of the present invention, the obtaining the global unique name of the storage device to be accessed by the virtual machine includes: obtaining the global unique name of the storage device according to a target link used for connecting the virtual machine with the storage device.

In an embodiment of the present invention, the mounting the storage device directly to the virtual machine includes: associating the target link used for connecting the virtual machine with the storage device with a virtual storage device which is corresponding to the storage device and created by the file system of the physical machine where the virtual machine located.

In an embodiment of the present invention, the associating the target link used for the virtual machine to connect to the storage device with a virtual storage device which is corresponding to the storage device and created by the file system of the physical machine where the virtual machine located includes: finding the virtual storage device which is corresponding to the storage device and created by the file system based on the global unique name of the storage device to be accessed by the virtual machine; and updating the target link used for connecting the virtual machine with the storage device to an address of the virtual storage device which is corresponding to the storage device and created by the file system.

In an embodiment of the present invention, the updating the target link used for the virtual machine to connect to the storage device to an address of the virtual storage device which is corresponding to the storage device and created by the file system includes: in a namespace of the virtual machine, replacing a parameter of the target link used for the virtual machine to connect to the storage device with the address of the virtual storage device which is corresponding to the storage device and created by the file system.

In an embodiment of the present invention, the method further includes: when it is judged that the storage device is not on the same physical machine as the virtual machine, connecting the virtual machine to the storage device through an iSCSI protocol.

In an embodiment of the present invention, the connecting the virtual machine to the storage device through an iSCSI protocol includes: associating a target link used for the virtual machine to connect to the storage device with a virtual storage device which is corresponding to the storage device and created based on the iSCSI protocol.

In an embodiment of the present invention, the cloud computing management platform includes one of the following architectural forms: OpenStack, CloudStack, VMware vCloud, Microsoft Azure Pack, OpenNebula and Eucalyptus.

According to an embodiment of the present invention, a device for a virtual machine to access a storage device in a cloud computing management platform is provided. The device includes: judging module, adapted to judge whether a storage device to be accessed by a virtual machine is on a same physical machine as the virtual machine; and mounting module, adapted to ensure the virtual machine directly mounting the storage device when it is judged that the virtual machine is on the same physical machine as the storage device.

In an embodiment of the present invention, the method further includes: acquiring module, adapted to obtain a global unique name of the storage device to be accessed by the virtual machine; wherein the judging module is further adapted to search in a file system of the physical machine where the virtual machine located to determine whether there is a name of a storage device containing the global unique name.

In an embodiment of the present invention, the acquiring module is further adapted to obtain the global unique name of the storage device according to a target link used for connecting the virtual machine with the storage device.

In an embodiment of the present invention, the mounting module is further adapted to, when it is judged that the storage device is on the same physical machine as the virtual machine, associate a target link used for the virtual machine to connect to the storage device with a virtual storage device which is corresponding to the storage device and created by a file system of the physical machine where the virtual machine located.

In an embodiment of the present invention, the mounting module is further adapted to, when it is judged that the storage device is not on the same physical machine as the virtual machine, ensure the storage device is connected to the virtual machine through the iSCSI protocol.

In an embodiment of the present invention, wherein the mounting module is further adapted to, when it is judged that the storage device is not on the same physical machine as the virtual machine, associate the target link used for connecting the virtual machine with the storage device with the virtual storage device which is corresponding to the storage device and created based on the iSCSI protocol.

According to the method and device for a virtual machine to access a storage devices in a cloud computing management platform provided by the embodiments of the present invention, when the virtual machine is going to be connected to the storage device, it is judged whether the virtual machine and the storage device are on a same physical machine firstly, when it is judged that the storage device is on the same physical machine as the virtual machine, the storage device is directly mounted to the physical machine. In this way, the virtual machine can be mounted to the storage device directly instead of passing through network communication based on the iSCSI protocol, thereby the speed of data read and write of the virtual machine can be greatly improved.

According to an embodiment of the present invention, a storage system is provided. The storage system including: a storage network; at least two storage nodes, connected to the storage network; and at least one storage device, connected to the storage network, each storage device including at least one storage medium; wherein, the storage network is configured to enable each storage node to access all the storage mediums without passing through other storage node.

The storage system provided by the embodiments of the present invention provides a storage pool that supports multi-nodes control and global access, has excellent scalability and high availability, can achieve large capacity by increasing the number of the storage mediums, and improves reliability against a single point of failure in the storage nodes.

DETAILED DESCRIPTION

The present invention will be described more fully hereinafter with reference to the accompanying drawings, in which the embodiments of the present invention are shown. These embodiments can, however, be embodied in many different forms and should not be construed as being limited to the embodiments set forth herein. Rather, these embodiments are provided so that the present invention is thorough and complete, and fully convey scope of the present invention to those skilled in the art.

The various embodiments of the present invention are described in detail in the following examples by combining with the accompanying drawings.

Figure 1:
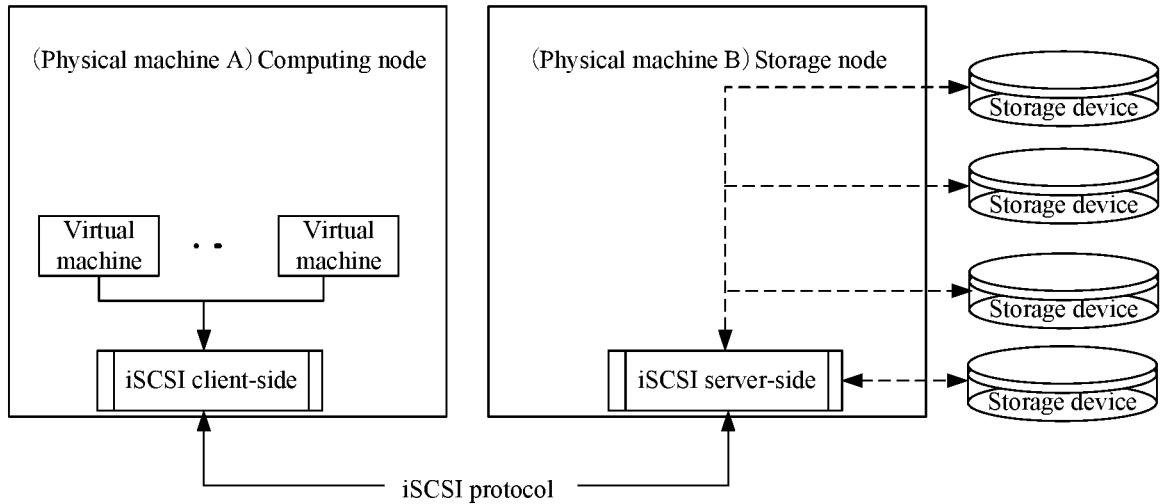
FIG. 1 shows a conventional architecture of connecting a computing node to storage devices provided by the prior art.
Figure 2:
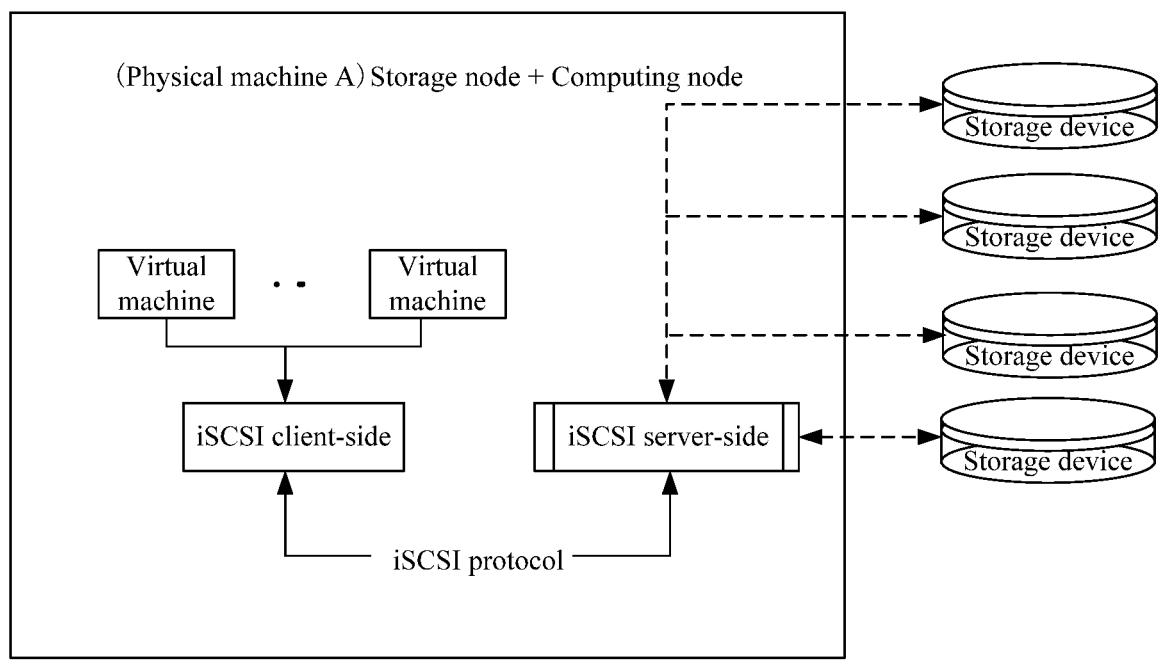
FIG. 2 shows another architecture of connecting a computing node to storage devices provided by prior art.
Figure 3:
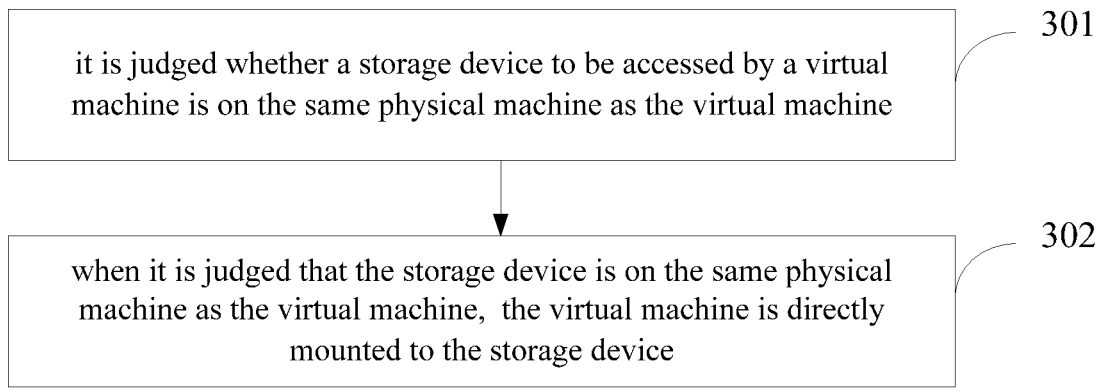
FIG. 3 shows a flow chart of a method for a virtual machine to access a storage device in a cloud computing management platform according to an embodiment of the present invention.

FIG. 3 shows a flow chart of a method for a virtual machine to access a storage device in a cloud computing management platform according to an embodiment of the present invention. As shown in FIG. 3, the method includes:

Step 301, it is judged whether a storage device to be accessed by a virtual machine is on the same physical machine as the virtual machine.

In an embodiment of the present invention, whether the storage device is on the same physical machine as the virtual machine can be judged by using a global unique name of the storage device in the cloud computing management platform. Specifically, the global unique name of the storage device to be accessed by the virtual machine has to be obtained at first, and then a searching process is implemented in a file system of the physical machine where the virtual machine located to determine whether there is a name of a storage device containing the global unique name. If the global unique name is found in registered storage device information of the file system, it is determined that there is a storage device corresponding with the global unique name and the storage device has been registered in the file system of the physical machine where the virtual machine located, that is to say the storage device and the virtual device are on the same physical machine.

Step 302, when it is judged that the storage device is on the same physical machine as the virtual machine, the virtual machine is directly mounted to the storage device. When it is judged that the storage device is on the same physical machine as the virtual machine, the virtual machine is directly mounted to the storage device, thereby a direct connection between the virtual machine and the storage device on the same physical machine has been achieved, instead of achieving the connection through network communication based on an iSCSI protocol, and the speed of data read and write of the virtual machine can be greatly improved. When it is judged that the storage device is not on the same physical machine as the virtual machine, the virtual machine can be connected to the storage device through an iSCSI protocol.

In an embodiment of the present invention, in the physical machine where the virtual machine located, two virtual storage devices are set up corresponding to each storage device, and the two virtual storage devices are respectively created by the iSCSI protocol and the file system of the physical machine. In this case, mounting a storage device to a virtual machine is actually associating the target link, which is used for a virtual machine to connect to a storage device, with one of the two virtual storage devices corresponding to the storage device.

Figure 4:
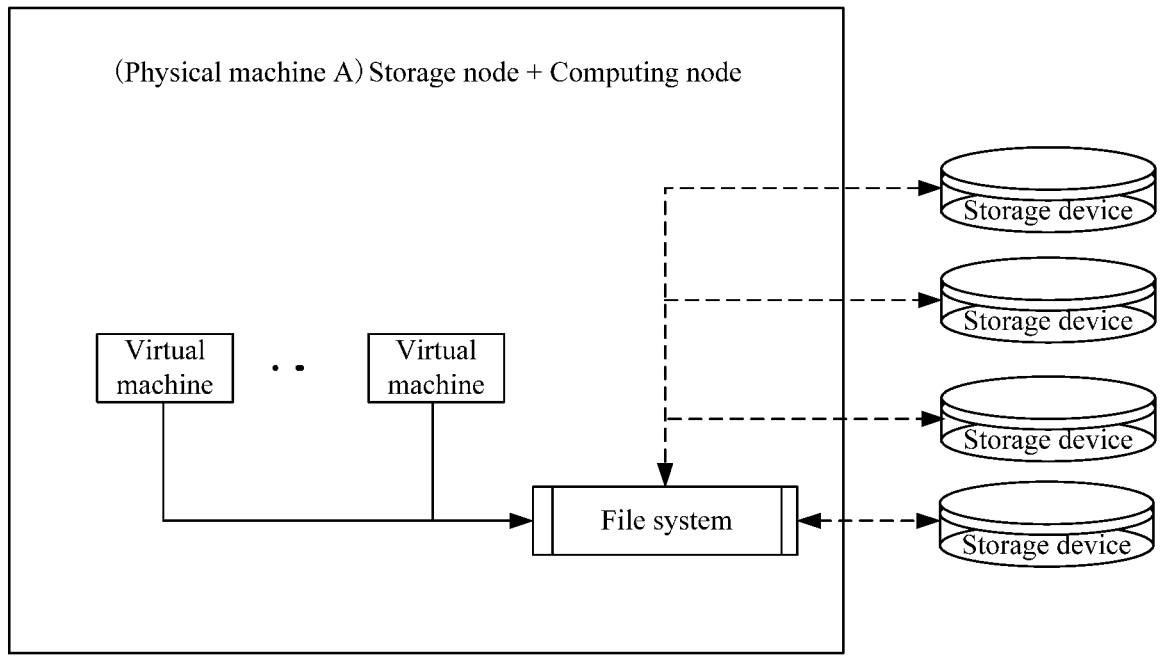
FIG. 4 shows a schematic diagram of a method for a virtual machine to access a storage device in a cloud computing management platform according to an embodiment of the present invention.

When it is judged that the virtual machine is on the same physical machine as the storage device to be accessed by the virtual machine, the virtual machine is directly mounted to the file system of the physical machine where the virtual machine located, as shown in FIG. 4, the registered storage device is determined through the file system, and then operations of data read and write on the storage device are implemented. In this case, the process of mounting the storage device to the virtual machine is actually associating the target link, which is used for the storage device to connect to a storage device, with the virtual storage device which is corresponding to the storage device and created by the file system. Specifically, based on the global unique name of the storage device to be accessed by the virtual machine, the virtual storage device corresponding to the storage device created by the file system is determined firstly, and then updating the target link, which is used for the virtual machine to connect to the storage device, to the address of the virtual storage device which is corresponding to the storage device and created by the file system. In an embodiment of the present invention, a more specific implementation manner may include following steps: in the namespace of the virtual machine, replacing a parameter of the target link, which is used for the virtual machine to connect the storage device, with the address of the virtual storage device which is corresponding to the storage device and created by the file system. For example, in a Linux operating system, the namespace of the virtual machine may be set up by calling libvirt, the setup process should follow the parameter rule of libvirt. In this way, the virtual machine can be mounted to the storage device directly instead of through network communication based on the iSCSI protocol, thereby the speed of data read and write of the virtual machine can be greatly improved.

When it is judged that the virtual machine is not on the same physical machine as the storage device to be accessed by the virtual machine, the virtual machine need to be connected to the storage device through the iSCSI protocol, in this case the target link, which is used for the virtual machine to connect the storage device, needs to be associated with the virtual storage device which is corresponding to the storage device and created by the iSCSI protocol.

In an embodiment of the present invention, the virtual machine may be set by default to be connected to the storage device created by the iSCSI protocol, and when it is judged that the virtual machine is on the same physical machine as the storage device to be accessed by the virtual machine, the storage device is directly mounted to the virtual machine. However, the default mounting mode between the virtual machine and the storage device cannot be used to limit the protection scope of the present invention.

In an embodiment of the present invention, a virtual machine instance001 is on a physical machine of a computing node in a cloud computing management platform, the virtual machine instance001 needs to access the storage device with a volume name volume-123456, and the volume name of each storage device is unique in the cloud computing management platform. In this case, in order to mount the storage device volume-123456 to the virtual machine instance001, the following steps may be implemented in the computing node where the virtual machine located.

1) ISCSI link parameters which are from default mount information of the virtual machine instance001 are found in the database of the computing node firstly, and then, the volume name volume-123456 of a storage device which is to be accessed by the virtual machine is obtained from the iSCSI link parameters.

2) Based on the volume name volume-123456, a corresponding storage device is searched under the /dev directory of the local Linux operating system of the computing node, the volume name of the storage device under the /dev directory may be volume-123456 or 123456.

3) When it is judged that the storage device named volume-123456 or 123456 is found under the /dev directory, the storage device named volume-123456 is on the same physical machine as the virtual machine instance001, thereby, the parameter dis_info passed to libvirt is modified, and the link address, that the virtual machine instance001 is original linked to iSCSI-target by default, is replaced with the address of the virtual storage device, which is created by a local file system corresponding to the storage device volume-123456 (A format such as /dev/xxx/volume name). Thus it is achieved that the virtual machine instance001 is directly associated with the local storage device volume-123456.

When it is judged that the storage device named volume-123456 or 123456 is not found under the /dev directory, the storage device named volume-123456 is not on the same physical machine as the virtual machine instance001, so the original link address of the virtual machine should be retained without any modification. In this way, the virtual machine instance001 is connected to the storage device volume-123456 through the iSCSI protocol by default.

In an embodiment of the present invention, the method for a virtual machine to access a storage device in a cloud computing management platform is applied to a cloud computing management platform adopting an OpenStack framework. The storage manage module of the OpenStack framework is Cinder. In the OpenStack framework, a storage device connected to a computing node through the storage management module Cinder is named a platform-unique long character code; when the computing node is naming the iSCSI target link of the storage device the virtual machine wants to access, the platform-unique long character code is also attached; and at each physical device terminal, the platform-unique long character code is also attached when the name of the storage device is registered in the local file system of the physical device through the iSCSI protocol. Therefore, the platform-wide unique long character code can be used as the global unique name to judge whether the virtual machine is on a same physical machine as the storage device to be accessed by the virtual machine.

Specifically, the global unique name (the platform-unique long character code) of the storage device according to the target link, which is used for the virtual machine to connect the storage device, has to be obtained at first, and then a searching process is implemented in the file system of the local physical machine where the virtual machine located to determine whether there is a name of a storage device containing the global unique name. If the global unique name is found in the registered device information in the file system, it is determined that there is a storage device corresponding with the global unique name and the storage device has been registered in the file system of the physical machine where the virtual machine located, that is to say the storage device is on a same physical machine as the virtual machine, and then a process that the virtual machine is mounted to the storage device is implemented.

It should be understood that, the method for a virtual machine to access a storage device provided by embodiments of the present invention can also be applied to other cloud computing management platforms other than OpenStack, such as CloudStack, VMware, vCloud, Microsoft Azure Pack, OpenNebula, Eucalyptus, ZStack and so on. The type of cloud computing management platform is not restricted.

It should be understood that, the storage device may be a physical disk or other storage medium, the specific implementation form of the storage device cannot be used to limit the protection scope of the present invention.

Figure 5:
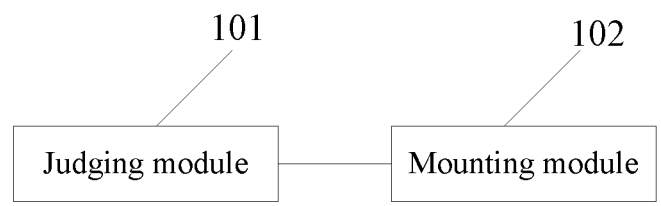
FIG. 5 shows an architectural schematic diagram of a device for a virtual machine to access a storage device in a cloud computing management platform according to an embodiment of the present invention.

A device of a virtual machine accessing a storage device in a cloud computing management platform is provided according to an embodiment of the present invention, as shown in FIG. 5, the device includes:

Judging module 101, which is adapted to judge whether a storage device to be accessed by a virtual machine is on a same physical machine as a virtual machine; and Mounting module 102, which is adapted to ensure the storage device directly mounting to the virtual machine when it is judged that the virtual machine is on the same physical machine as the storage device.

Figure 6:
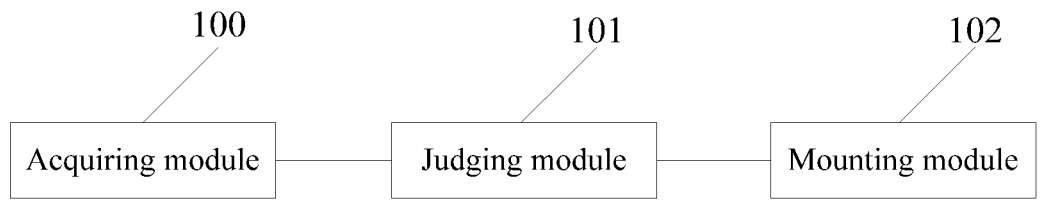
FIG. 6 shows an architectural schematic diagram of a device for a virtual machine to access a storage device in a cloud computing management platform according to an embodiment of the present invention.

In an embodiment of the present invention, whether the storage device is on the same physical machine as the virtual machine can be judged using a global unique name of the storage device in a cloud computing management platform, in this case, the device further includes, as shown in FIG. 6:

Acquiring module 100, which is adapted to obtain the global unique name of the storage device to be accessed by the virtual machine; wherein, the judging module 101 is further adapted to search in a file system of the physical machine where the virtual machine located to determine whether there is a name of a storage device containing the global unique name.

In an embodiment of the present invention, the acquiring module 100 is further adapted to obtain the global unique name of the storage device according to a target link used for connecting the virtual machine with the storage device.

In an embodiment of the present invention, the mounting module 102 is further adapted to, when it is judged that the storage device is on the same physical machine as the virtual machine, associate the target link used for connecting a virtual storage device with the storage device with a virtual storage device which is corresponding to the storage device and created by the file system of the physical machine where the virtual machine located.

In an embodiment of the present invention, the mounting module 102 is further adapted to, when it is judged that the storage device is not on the same physical machine as the virtual machine, ensure the virtual machine is connected to the storage device through an iSCSI protocol. Specifically the target link used for connecting a virtual storage device with the storage device can be associated with the virtual storage device which is corresponding to the storage device and created by the iSCSI protocol.

It should be understood that, in order not to make the embodiments of the present invention ambiguous, only some critical and unnecessary techniques and features are described, and some features that can be achieved by those skilled in the art may not described.

Figure 8:
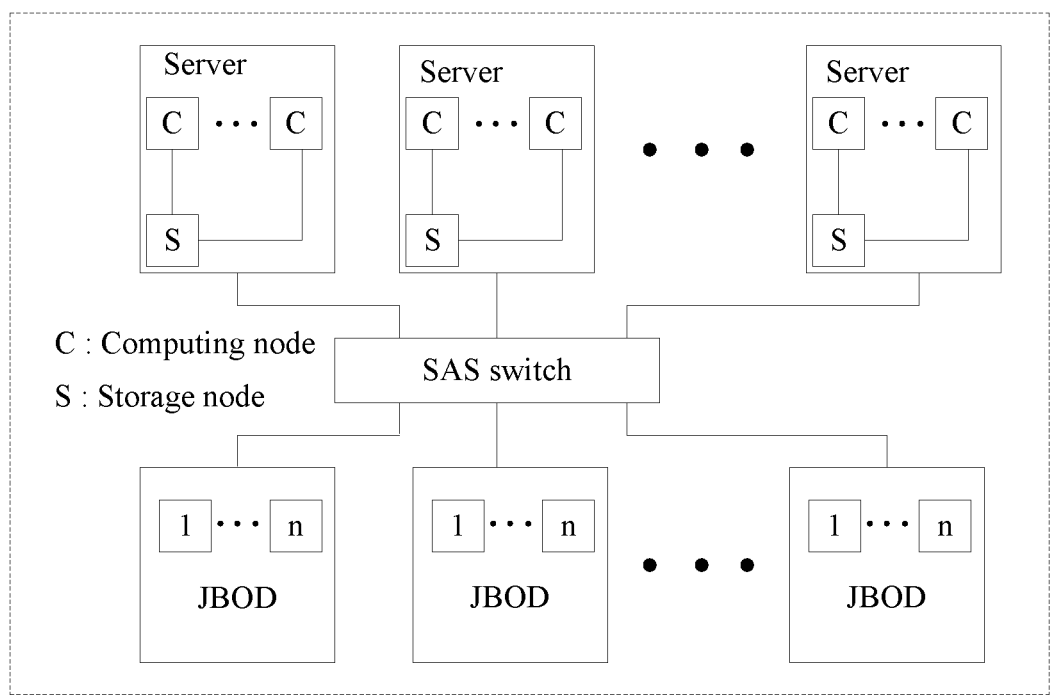
FIG. 8 shows an architectural schematic diagram of a specific storage system constructed according to an embodiment of the present invention.

FIG. 8 shows an architectural schematic diagram of a storage system according to an embodiment of the present invention. As shown in FIG. 8, the storage system includes a storage network, storage nodes connected to the storage network, and storage devices also connected to the storage network. Each storage device includes at least one storage medium. For example, a storage device commonly used by the inventor may include 45 storage mediums. Wherein, the storage network is configured to enable each storage node to access all the storage mediums without passing through other storage node.

In the storage system provided by the embodiments of the present invention, each storage node can access all the storage mediums without passing through other storage node, so that all the storage mediums are actually shared by all the storage nodes, and therefore a global storage pool is achieved.

At the same time, compared with the prior art, which the storage node is located on the storage-medium-side, or strictly speaking, the storage medium is a built-in disk of a physical device where the storage node is located; in the embodiments of the present invention, the physical device where the storage node is located, is independent of the storage device, and the storage device is mainly used as a channel to connect the storage medium to the storage network.

In this way, there is no need to physically move data between different storage mediums when the rebalancing (adjust the relationship between data and storage node) is required, as long as re-configure different storage nodes to balance data managed.

In an embodiment of the present invention, storage system software is run on storage node to access the storage mediums managed by the storage node. The storage location of the storage software is not specifically limited. For example, it may be stored on the storage node or stored on a JBOD.

In another embodiment of the present invention, the storage-node-side further includes a computing node, and the computing node and the storage node are located in same physical server connected to the storage devices via the storage network. By using the converged storage system in which the computing node and the storage node are located in same physical device provided by the embodiments of the present invention, the number of physical devices required can be reduced from the point of view of whole system, and thereby the cost is reduced. At the same time, the computing node can locally access any storage resource that they want to access. In addition, since the computing node and the storage node are converged in same physical server, data exchanging between the two can be as simple as memory sharing or API call, so the performance is particularly excellent.

Figure 7:
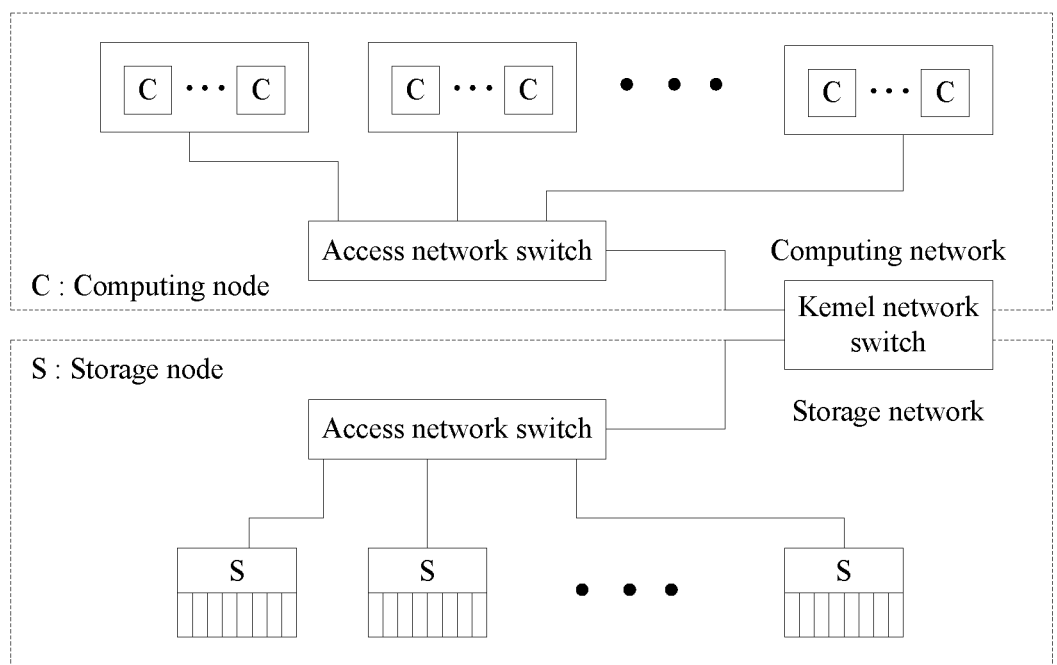
FIG. 7 shows an architectural schematic diagram of a storage system provided by the prior art.

In a storage system provided by an embodiment of the present invention, the I/O (input/output) data path between the computing node and the storage medium includes: (1) the path from the storage medium to the storage node; and (2) the path from the storage node to the computing node located in one same physical server with the storage node (CPU bus or faster). However, in comparison, in the storage system provided by the prior art as shown in FIG. 7, the I/O data path between the computing node and the storage medium includes: (1) the path from the storage medium to the storage node; (2) the path from the storage node to the access network switch of the storage network; (3) the path from the access network switch of the storage network to the kernel network switch; (4) the path from the kernel network switch to the access network switch of the computing network; and (5) the path from the access network switch of the computing network to the computing node. It is apparent that the total data path of the storage system provided by the embodiments of the present invention is only close to item (1) of the conventional storage system. Therefore, the storage system provided by the embodiments of the present invention can greatly compress the data path, so that I/O channel performance of the storage system can be greatly improved, and the actual operation effect is very close to reading or writing an I/O channel of a local drive.

In an embodiment of the present invention, the storage node may be a virtual machine of a physical server, a container or a module running directly on a physical operating system of the server, and the computing node may also be a virtual machine of the same physical server, a container, or a module running directly on a physical operating system of the server. In an embodiment of the present invention, each storage node may correspond to one or more computing nodes.

Specifically, one physical server may be divided into multiple virtual machines, wherein one of the virtual machines may be used as the storage node, and the other virtual machines may be used as the computing nodes; or, in order to achieve a better performance, one module of the physical OS (operating system) may be used as the storage node.

In an embodiment of the present invention, the virtual machine may be built through one of following virtualization technologies: KVM, Zen, VMware and Hyper-V, and the container may be built through one of following container technologies: Docker, Rockett, Odin, Chef, LXC, Vagrant, Ansible, Zone, Jail and Hyper-V.

In an embodiment of the present invention, the storage nodes are only responsible for managing corresponding storage mediums respectively at the same time, and one storage medium cannot be simultaneously written by multiple storage nodes, so that data conflicts can be avoided. As a result each storage node can access the storage mediums managed by itself without passing through other storage nodes, and integrity of the data stored in the storage system can be ensured.

In an embodiment of the present invention, all the storage mediums in the system may be divided according to a storage logic, specifically, the storage pool of the entire system may be divided according to a logical storage hierarchy which includes storage areas, storage groups and storage blocks, wherein, the storage block is the smallest storage unit. In an embodiment of the present invention, the storage pool may be divided into at least two storage areas.

In an embodiment of the present invention, each storage area may be divided into at least one storage group. In a preferred embodiment, each storage area is divided into at least two storage groups.

In some embodiments of the present invention, the storage areas and the storage groups may be merged, so that one level may be omitted in the logical storage hierarchy.

In an embodiment of the present invention, each storage area (or storage group) may include at least one storage block, wherein the storage block may be one complete storage medium or a part of one storage medium. In order to build a redundant storage mode within the storage area, each storage area (or storage group) may include at least two storage blocks, when any one of the storage blocks fails, complete data stored can be calculated from the rest of the storage blocks in the storage area. The redundant storage mode may be a multi-copy mode, a redundant array of independent disks (RAID) mode, or an erasure code mode, or BCH (Bose-Chaudhuri-Hocquenghem) codes mode, or RC(Reed-Solomon) codes mode, or LDPC (low-density parity-check) codes mode, or a mode that adopts other error-correcting code. In an embodiment of the present invention, the redundant storage mode may be built through a ZFS (zettabyte file system). In an embodiment of the present invention, in order to deal with hardware failures of the storage devices/storage mediums, the storage blocks included in each storage area (or storage group) may not be located in one same storage medium, even not be located in one same storage device. In an embodiment of the present invention, any two storage blocks included in same storage area (or storage group) may not be located in one same storage medium, or even not located in one same storage device. In another embodiment of the present invention, in one storage area (or storage group), the number of the storage blocks located in same storage medium/storage device is preferably less than or equal to the fault tolerance level (the max number of failed storage blocks without losing data) of the redundant storage. For example, when the redundant storage applies RAID5, the fault tolerance level is 1, so in one storage area (or storage group), the number of the storage blocks located in same storage medium/storage device is at most 1; for RAID6, the fault tolerance level of the redundant storage mode is 2, so in one storage area (or storage group), the number of the storage blocks located in same storage medium/storage device is at most 2.

In an embodiment of the present invention, each storage node can only read and write the storage areas managed by itself. In another embodiment of the present invention, since multiple storage nodes do not conflict with each other when read one same storage block but easily conflict with each other when write one same storage block, each storage node can only write the storage areas managed by itself but can read the storage areas managed by itself and the storage areas managed by the other storage nodes. Thus it can be seen that writing operations are local, but reading operations are global.

In an embodiment of the present invention, the storage system may further include a storage control node, which is connected to the storage network and adapted for determining the storage areas managed by each storage node. In another embodiment of the present invention, each storage node may include a storage allocation module, adapted for determining the storage areas managed by the storage node. The determining operation may be implemented through communication and coordination algorithms between the storage allocation modules included in each storage node, for example, the algorithms may be based on a principle of load balancing between the storage nodes.

In an embodiment of the present invention, when it is detected that a storage node fails, some or all of the other storage nodes may be configured to take over the storage areas previously managed by the failed storage node. For example, one of the other storage nodes may be configured to take over the storage areas previously managed by the failed storage node, or at least two of the other storage nodes may be configured to take over the storage areas previously managed by the failed storage node, wherein each storage node may be configured to take over a part of the storage areas previously managed by the failed storage node, for example the at least two of the other storage nodes may be configured to respectively take over different storage groups of the storage areas previously managed by the failed storage node.

In an embodiment of the present invention, the storage medium may include but is not limited to a hard disk, a flash storage, a SRAM (static random access memory), a DRAM (dynamic random access memory), a NVME (non-volatile memory express) storage, a 3DXPoint storage, or the like, and an access interface of the storage medium may include but is not limited to a SAS (serial attached SCSI) interface, a SATA (serial advanced technology attachment) interface, a PCI/e (peripheral component interface-express) interface, a DIMM (dual in-line memory module) interface, a NVMe (non-volatile memory express) interface, a SCSI (small computer systems interface), an ethernet interface, an infiniband interface, a omipath interface, or an AHCI (advanced host controller interface).

In an embodiment of the present invention, the storage network may include at least one storage switching device, and the storage nodes access the storage mediums through data exchanging between the storage switching devices. Specifically, the storage nodes and the storage mediums are respectively connected to the storage switching device through a storage channel.

In an embodiment of the present invention, the storage switching device may be a SAS switch, an ethernet switch, an infiniband switch, an omnipath switch or a PCI/e switch, and correspondingly the storage channel may be a SAS (Serial Attached SCSI) channel, an ethernet channel, an infiniband channel, an omnipath channel or a PCI/e channel.

Taking the SAS channel as an example, compared with a conventional storage solution based on an IP protocol, the storage solution based on the SAS switch has advantages of high performance, large bandwidth, a single device including a large number of disks and so on. When a host bus adapter (HBA) or a SAS interface on a server motherboard is used in combination, storage mediums provided by the SAS system can be easily accessed simultaneously by multiple connected servers.

Specifically, the SAS switch and the storage device are connected through a SAS cable, and the storage device and the storage medium are also connected by the SAS interface, for example, the SAS channel in the storage device is connected to each storage medium (a SAS switch chip may be set up inside the storage device). Because the bandwidth of the SAS network can reach 24 Gb or 48 Gb, which is dozens of times the bandwidth of the Gigabit Ethernet, and several times the bandwidth of the expensive 10-Gigabit Ethernet; at the same time, at the link layer, the SAS network has about an order of magnitude improvement over the IP network, and at the transport layer, a TCP connection is established with a three handshake and closed with a four handshake, so the overhead is high, and Delayed Acknowledgement mechanism and Slow Start mechanism of the TCP protocol may cause a 100-millisecond-level delay, however the delay caused by the SAS protocol is only a few tenths of that of the TCP protocol, so there is a greater improvement in performance. In summary, the SAS network offers significant advantages in terms of bandwidth and delay over the Ethernet-based TCP/IP network. Those skilled in the art can understand that the performance of the PCI/e channel can also be adapted to meet the needs of the system.

In an embodiment of the present invention, the storage network may include at least two storage switching devices, each of the storage nodes may be connected to any storage device through any storage switching device, and further connected to the storage mediums. When a storage switching device or a storage channel connected to a storage switching device fails, the storage nodes can read and write the data on the storage devices through the other storage switching devices.

Figure 9:
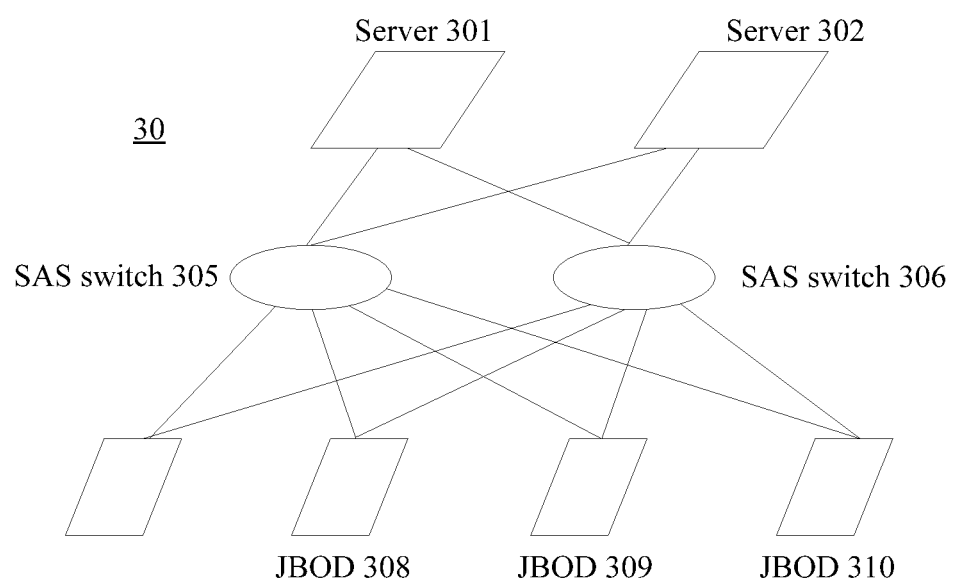
FIG. 9 shows an architectural schematic diagram of a storage system according to an embodiment of the present invention.

In FIG. 9, a specific storage system 30 provided by an embodiment of the present invention is illustrated. The storage devices in the storage system 30 are constructed as multiple JBODs (Just a Bunch of Disks) 307-310, these JBODs are respectively connected to two SAS switches 305 and 306 via SAS cables, and the two SAS switches constitute the switching core of the storage network included in the storage system. A front end includes at least two servers 301 and 302, and each of the servers is connected to the two SAS switches 305 and 306 through a HBA device (not shown) or a SAS interface on the motherboard. There is a basic network connection between the servers for monitoring and communication. Each of the servers has a storage node that manages some or all of the disks in all the JBODs. Specifically, the disks in the JBODs may be divided into different storage groups according to the storage areas, the storage groups, and the storage blocks described above. Each of the storage nodes manage one or more storage groups. When each of the storage groups applies the redundant storage mode, redundant storage metadata may be stored on the disks, so that the redundant storage mode may be directly identified from the disks by the other storage nodes.

In the exemplary storage system 30, a monitoring and management module may be installed in the storage node to be responsible for monitoring status of local storage and the other server. When a JBOD is overall abnormal or a certain disk on a JBOD is abnormal, data reliability is ensured by the redundant storage mode. When a server fails, the monitoring and management module in the storage node of another pre-set server will identify locally and take over the disks previously managed by the storage node of the failed server, according to the data on the disks. The storage services previously provided by the storage node of the failed server will also be continued on the storage node of the new server. At this point, a new global storage pool structure with high availability is achieved.

It can be seen that the exemplary storage system 30 provides a storage pool that supports multi-nodes control and global access. In terms of hardware, multiple servers are used to provide the services for external user, and the JBODs are used to accommodate the disks. Each of the JBODs is respectively connected to two SAS switches, and the two switches are respectively connected to a HBA card of the servers, thereby ensuring that all the disks on the JBODs can be accessed by all the servers. SAS redundant links also ensure high availability on the links.

On the local side of each server, according to the redundant storage technology, disks are selected from each JBOD to form the redundant storage mode, to avoid the data unable to be accessed due to the failure of one JBOD. When a server fails, the module that monitors the overall state may schedule another server to access the disks managed by the storage node of the failed server through the SAS channels, to quickly take over the disks previously managed by the failed server and achieve the global storage pool with high availability.

Although it is illustrated as an example in FIG. 9 that the JBODs may be used to accommodate the disks, it should be understood that the embodiment of the present invention shown in FIG. 9 also may apply other storage devices than the JBODs. In addition, the above description is based on the case that one (entire) storage medium is used as one storage block, but also applies to the case that a part of one storage medium is used as one storage block.

It should be understood that, in order not to make the embodiments of the present invention ambiguous, only some critical and unnecessary techniques and features are described, and some features that can be achieved by those skilled in the art may not described.

The above description is merely preferable embodiments of the present invention and is not intended to limit the scope of the present invention, any amendment or equivalent replacement, etc., within the spirit and the principle of the present invention, should be covered in the protection scope of the present invention.

What is claimed is:

1. A method for a virtual machine to access a storage device in a cloud computing management platform, comprising:
    obtaining a global unique name of a storage device to be accessed by a computing node according to a target link used for connecting the computing node with the storage device;
    searching in a file system of a physical machine where the computing node located to determine whether there is a name of a storage device containing the global unique name of the storage device; and
    when it is judged that the storage device is on the same physical machine as the computing node, finding a virtual storage device which is corresponding to the storage device and created by the file system, based on the global unique name of the storage device, and updating the target link used for the computing node to connect to the storage device to an address of the virtual storage device which is corresponding to the storage device and created by the file system.

2. The method of claim 1, wherein the updating the target link used for the computing node to connect to the storage device to an address of the virtual storage device which is corresponding to the storage device and created by the file system comprises:
    in a namespace of the computing node, replacing a parameter of the target link used for the computing node to connect to the storage device with the address of the virtual storage device which is corresponding to the storage device and created by the file system.

3. The method of claim 1, further comprising:
    when it is judged that the storage device is not on the same physical machine as the computing node, connecting the computing node to the storage device through an iSCSI protocol.

4. The method of claim 3, wherein the connecting the computing node to the storage device through an iSCSI protocol comprises:
    associating the target link used for the computing node to connect to the storage device with a virtual storage device which is corresponding to the storage device and created based on the iSCSI protocol.

5. The method of claim 1, wherein the cloud computing management platform comprises one of the following architectural forms: OpenStack, CloudStack, VMware vCloud, Microsoft Azure Pack, OpenNebula and Eucalyptus.

6. The method of claim 1, wherein the computing node comprise a virtual machine.

7. A device for a virtual machine to access a storage device in a cloud computing management platform, comprising:
    acquiring module, adapted to obtain a global unique name of a storage device to be accessed by a computing node according to a target link used for connecting the computing node with the storage device;
    judging module, adapted to search in a file system of a physical machine where the computing node located to determine whether there is a name of a storage device containing the global unique name of the storage device; and
    mounting module, adapted to, when it is judged that the computing node is on the same physical machine as the storage device, find a virtual storage device which is corresponding to the storage device and created by the file system, based on the global unique name of the storage device, and update the target link used for the computing node to connect to the storage device to an address of the virtual storage device which is corresponding to the storage device and created by the file system.

8. The device of claim 7, wherein the mounting module is further adapted to, when it is judged that the storage device is not on the same physical machine as the computing node, ensure the storage device is connected to the computing node through the iSCSI protocol.

9. The device of claim 8, wherein the mounting module is further adapted to, when it is judged that the storage device is not on the same physical machine as the computing node, associate the target link used for connecting the computing node with the storage device with a virtual storage device which is corresponding to the storage device and created based on the iSCSI protocol.

\* \* \* \* \*